United States Patent
Takeda et al.

(10) Patent No.: US 6,391,079 B1
(45) Date of Patent: May 21, 2002

(54) FERTILIZER WITH A CHELATE ELEMENT

(76) Inventors: Iwao Takeda, 4066-2 Nakaminowa, Oaza, Minowa-cho, Kamiina-gun, Nagano, 399-4601 (JP); Kaname Yoshie, 1118 Tatsuno, Oaza, Tatsuno-cho, Kamiina-gun, Nagano, 399-0421 (JP)

( * ) Notice: Subject to any disclaimer, the term of this patent is extended or adjusted under 35 U.S.C. 154(b) by 0 days.

(21) Appl. No.: 09/638,617

(22) Filed: Aug. 15, 2000

(51) Int. Cl.⁷ .................................................. C05G 3/00
(52) U.S. Cl. ........................ 71/27; 71/31; 71/32; 71/61
(58) Field of Search ................................ 71/27, 31, 32, 71/61

(56) References Cited

U.S. PATENT DOCUMENTS

| | | | |
|---|---|---|---|
| 3,856,500 A | * 12/1974 | Cox ............................... | 71/34 |
| 5,997,600 A | * 12/1999 | Dean ............................. | 71/27 |
| 6,241,795 B1 | * 6/2001 | Svec et al. ..................... | 71/11 |

FOREIGN PATENT DOCUMENTS

| | | |
|---|---|---|
| JP | 55015901 | 2/1980 |
| JP | 55126594 | 9/1980 |
| JP | 58223681 | 12/1983 |
| JP | 9183681 | 7/1997 |
| WO | 9800012 | * 1/1998 |

* cited by examiner

*Primary Examiner*—Chhaya D. Sayala
(74) *Attorney, Agent, or Firm*—Bachman & LaPointe, P.C.

(57) ABSTRACT

Fertilizer with a chelate element is provided which comprises 0.01 to 4 parts of a compound of a metal for forming the central metal of a chelate compound, 1 to 5 parts of an oxycarboxylic acid, 2 to 8 parts of a potassic element, 0.1 to 1 part of a nitrogenous element, and 0.01 to 2 parts of a phosphorous element by weight, indicating a pH value of 6.0 to 7.5 when mixed with water. When a living body ingests an agricultural product cultivated with the fertilizer, the chelate derives glutathione S-transferase molecular species which can catalyze the detoxicating reaction of the electrophillic compound by the S-bonded reaction of said electrophillic compound and nucleophillic reduction-type glutathione peroxidase.

10 Claims, No Drawings

FERTILIZER WITH A CHELATE ELEMENT

BACKGROUND OF THE INVENTION

1. Field of the Invention

The present invention relates to an manure, and particularly, a fertilizer with a chelate element comprising an oxycarboxylic acid and a metal.

2. Description of the Prior Art

Fertilizers are applied to soil to supply nutrition to agricultural products for increasing the yield and to prevent degradation of the fertility of the soil. It is known to supply, to soil, large amounts of three major manurial components of nitrogen (N), phosphorus (P) and potassium (K) indispensable for growth of plants. Nitrogen serves to promote synthesis of protein in a plant, division and multiplication of cells, growth of the roots and sufficient upgrowth of the leaves and stems and to advance absorption and the anabolism of the nutrition. Phosphorus is effective to accelerate growth of the roots to increase the nutrition absorbing area of them and to activate the germination. In addition, it contributes to hasten maturation of plants and increase the yield of seeds and fruits. Also, phosphorus is useful to enhance generation of starch and activity of the enzymes and microorganisms, to prevent noxious insects and to improve quality of the harvest. Potassium is efficacious to synthesize carbohydrates and nitrogen compounds, to promote anabolism, growth of the roots, flowering and fruitage to adjust evaporation of the water supplied and to increase the resistance to damages by cold weather and harmful insects. In addition to three major manurial components, the fertilizer may contain calcium (Ca), magnesium (Mg), silicon (Si), manganese (Mn), zinc (Zn), copper (Cu), molybdenum (Mo), iron (Fe), and boron (B) to directly or indirectly assist the good growth of plants.

Any fertilizer is required to contain larger amounts of effective components, without disadvantageous, substances so that it allows large scale production of crops through easy treatment and inexpensive process with a low hygroscopicity and caking. In recent years, upgraded agricultural products have been required at a request of consumers who require high quality of crops with good appearance in color and luster, excellent aroma and delicious taste. Also, the consumers have needed the medicinal efficacy of the agricultural products which satisfies their health desire so that the fertilizers must be ameliorated to improve quality of the agricultural products.

An object of the present invention is to provide a fertilizer which contains a chelate effective to cultivate agricultural products with their good color, excellent aroma and delicious taste as well as antiseptic and fungicidal. Another object of the present invention is to provide fertilizer with a chelate element capable of cultivating agricultural products which can generate active enzymes in a living body ingesting the products so that the active enzymes are effective to detoxify hydrogen peroxide, organic peroxides, carcinogenic substances with anti-oxidation.

SUMMARY OF THE INVENTION

The fertilizer according to the present invention comprises on the basis of weight 0.01 to 4 parts of a compound of metal for forming the central metal of the chelate, 1 to 5 parts of an oxycarboxylic acid, 2 to 8 parts of a potassic element, 0.1 to 1 part of a nitrogenous element, and 0.01 to 2 parts of a phosphorus element to provide a pH value of 6.0 to 7.5 when mixed with water. When a living body ingests the agricultural product cultivated with the fertilizer, the chelate can derive glutathione S-transferase (GST) molecular species which catalyze the detoxicating reaction of the electrophillic compound by the S-bonded reaction of the electrophillic compound and nucleophillic reduction-type glutathione peroxidase.

When the chelate comprises oxycarboxylic acid and metal, it can constitute enzymes which would produce various detoxifying and anti-oxidation effects, because the chelate provides an active center incorporated in the peptide chain to be subjected to oxidation-reduction in substrate. The generated enzymes act as a catalyst for reduction reaction into water or alcohol of hydrogen peroxide water, organic peroxides, and other highly reactive electrophillic compound. The electrophillic compound is derived from hydroxylation of various medicines comprising a chemical carcinogen, and the electrophillic compound causes mutation, carcinogenesis, a cytotoxic effect and the like, when it produces a covalent bond with the nucleophillic portion of DNA or protein, but, if a living body ingests an agricultural product cultivated with the fertilizer according to the present invention, the chelate certainly derives an active enzyme or glutathione S-transferase (GST) molecular species which can catalyze the S-bonded reaction of an electrophillic compound and nucleophillic reduction-type glutathione peroxidase (GSH) for detoxification.

DESCRIPTION OF THE PREFERRED EMBODIMENTS

Detailed embodiments of the fertilizer according to the present invention are described hereinafter.

The fertilizer with a chelate element according to the present invention, comprises on the basis of weight 0.01 to 4 parts of a compound of metal for forming the central metal of the chelate, 1 to 5 parts of an oxycarboxylic acid, 2 to 8 parts of a potassic element, 0.1 to 1 part of a nitrogenous element, and 0.01 to 2 parts of a phosphorus element, providing a pH value of 6.0 to 7.5 when mixed with water. The fertilizer can derive glutathione S-transferase molecular species when a living body ingests an agricultural product cultivated with the fertilizer.

If the amount of the compound of metal is under 0.01 part or if the amount of the oxycarboxylic acid is under 1 part, no chelate compound will be generated. Although the amount of the compound of metal exceeds 4 parts, the effect of the fertilizer would be kept unchanged, but it must be required to prevent contamination of the soil by an excessive amount of the compound of metal accumulated therein. The amount of the oxycarboxylic acid over 5 parts will disadvantageously make the chelate compound unstable. The amount of the potassic element under 2 parts will prepare no sufficient amounts of carbohydrates and nitrogen compounds. The amount of the nitrogenous fertilizer under 0.1 part will generate no sufficient amount of protein. The amount of the phosphorus element under 0.01 part will be unable to sufficiently promote growth of the roots of agricultural products. The amounts of potassic element over 8 parts, nitrogenous element over 1 part, and phosphorus element over 2 parts will undesirably supply an excessive amount of the fertilizer in the soil with unchanged physiologic action of each fertilizer and with a possible ill effect on the soil. The. pH value of the fertilizer under 6.0 will result in possibility of the soil contamination due to the excessive acidity, and the pH value over 7.5 will affect the stability of the complex.

The fertilizer may further comprise at least an additional acid selected from the group of saccharic acid, fatty acid and mixture thereof in the total amount: 1 to 5 parts of the oxycarboxylic acid and the additional acid. The compound of metal is selected from groups of germanium compound, selenium compound and mixture thereof. Specifically, the fertilizer may comprise 0.05 to 2 parts of germanium acetate as the chelate element, 1.5 to 2.5 parts of glyceric acid as the ocarboxylic acid, 5 to 7 parts of a potassic element, 0.1 to 0.5 parts of a nitrogenous element, and 0.03 to 1 part of a phosphorus element by weight to provide a pH value of 6.8 to 7.3 when mixed with water. Otherwise, the fertilizer may comprise 0.03 to 2 parts of selenium trioxide ($SeO_3$) as the chelate element or a compound of metal, 0.5 to 1.5 parts of citric acid, 0.5 to 1.5 parts of pentaric acid as a saccharic acid, 0.5 to 1.5 parts of acetic acid as a fatty acid, 3 to 5 parts of a potassic element, 0.3 to 0.8 parts of a nitrogenous element, and 0.5 to 1 part of a phosphorus element by weight to provide a pH value of 6.3 to 7.0 when mixed with water. The fertilizer may comprise at least an additional acid selected from the group of saccharic acid, fatty acid and mixture thereof in the total amount: 1 to 5 parts of oxycarboxylic acid and additional acid. The compound of metal is preferably a germanium compound or a selenium compound. The fertilizer preferably comprises 0.05 to 2 parts of germanium acetate ($Ge(CH_3CO_2)_4$) as a compound of metal, 1.5 to 2.5 parts of glyceric acid as an oxycarboxylic acid, 5 to 7 parts of a potassic element, 0.1 to 0.5 parts of a nitrogenous element, and 0.03 to 1 part of a phosphorus element by weight to provide a pH value of 6.8 to 7.3 when mixed with water. Also, the fertilizer preferably comprises 0.03 to 2 parts of selenium trioxide, 0.5 to 1.5 parts of citric acid, 0.5 to 1.5 parts of pentaric acid, 0.5 to 1.5 parts of acetic acid, 3 to 5 parts of a potassic element, 0.3 to 0.8 parts of a nitrogenous element, and 0.5 to 1 part of a phosphorus element by weight to provide a pH value of 6.3 to 7.0 when mixed with water.

The raw material for the compound of metal preferably includes metal chlorides, metallic salts, such as a sulfate, a nitrate, a phosphate, an acetate, a silicate, and a borate, metal oxides, metal hydroxides to form the central metal of the chelate compound. The central metal of the chelate compound should be one or more selected from the groups of calcium (Ca), magnesium (Mg), manganese (Mn), zinc (Zn), copper (Cu), molybdenum (Mo), iron (Fe), aluminum (Al), nickel (Ni), cobalt (Co), titanium (Ti), gallium (Ga), selenium (Se), germanium (Ge), vanadium (Va), chromium (Cr), silver (Ag), strontium (Sr), indium (In), tin (Sn), gold (Au) and zirconium (Zr).

The term "oxycarboxylic acid" means organic compounds having a carboxyl group and one or more hydroxyl groups in one molecule, also as called "moxyacid" or "alcohol acid" excluding saccharic acid and fatty acid. The term "saccharic acid" means polyhydroxy-dicarboxylic acids and is also called aldanic acid, glyraric acid, aldaric acid, or saccharic acid which can be derived from an aldose with both ends of an aldehyde group and a carbinol group oxidized to a carboxylic group. The "fatty acid" generally refers to a fatty monocarboxylic acid, however, except oxycarboxylic acid and without hydroxyl group (OH) herein.

Preferable oxycarboxylic acid includes a fatty oxyacid such as glycolic acid (HO—$CH_2$—COOH), lactic acid ($CH_3$—CH(OH)—COOH), hydroacrylic acid (HO—$CH_2CH_2$—COOH), α-oxybutyric acid ($CH_3CH_2$CH(OH)—COOH), glyceric acid (HO—$CH_2$CH(OH)—COOH), mandelic acid ($C_6H_5$—CH(OH)—OOH) and tropic acid ($c_6H_5$—CH($CH_2$OH)—COOH); and an aromatic oxyacid such as salicylic acid ($C_7H_6O_3$), m-oxybenzoic acid ($C_7H_6O_3$), p-oxybenzoic acid ($C_7H_6O_3$) and gallic acid ($C_7H_6O_5$). The fatty oxyacid may include a fatty carboxylic acid or an aromatic carboxylic acid with an alcoholic hydroxyl group in the side chain. The aromatic oxyacid may include an aromatic carboxylic acid with an alcoholic hydroxyl group in the ring.

Preferable saccharic acid (HOOC—$(CHOH)_n$—COOH) may include pentaric acid (HOOC—$(CHOH)_3$—COOH), and hexalic acid (HOOC—$(CHOH)_4$—COOH) including gluconic acid. Preferable fatty acid may include a saturated fatty acid such as formic acid (H—COOH), acetic acid ($CH_3$—COOH), propionic acid ($CH_3CH_2$—COOH), lauric acid ($CH_3(CH_2)_{10}$—COOH), myristic acid ($CH_3(CH_2)_{12}$—COOH), palmitic acid ($CH_3(CH_2)_{14}$—COOH) and stearic acid ($CH_3(CH_2)_{16}$—COOH); and an unsaturated fatty acid such as acrylic acid ($CH_2$=CH—COOH), crotonic acid ($CH_3$CH=CH—COOH), oleic acid ($CH_3(CH_2)_7$CH=CH$(CH_2)_7$—COOH), sorbic acid ($CH_3$CH=CHCH=CH—COOH), linoleic acid ($CH_3(CH_2)_4$CH=CHCH$_2$CH=CH$(CH_2)_7$—COOH) and linolenic acid($C_{18}H_{30}O_2$). Preferable potassic element may include potassium chloride (KCl), potassium sulfate ($K_2SO_4$), Carnallite ($KCl.MgCl_2.6H_2O$), potash ores (containing KCl or $K_2SO_4$), bittern potassium salt (KCl(+NaCl+$MgSO_4$)), plant and wood ashes ($K_2CO_3$+$KHCO_3$), kelp ashes (KCl+$K_2SO_4$), cement dust (sulfate, carbonate, and silicate) and blast furnace dust (carbonate and sulfate). Preferable nitrogenous element may include ammoniacal nitrogen such as ammonium sulfate (($NH_4)_2SO_4$), ammonium chloride ($NH_4Cl$), ammonium nitrate ($NH_4NO_3$), ammonium phosphate (($NH_4)_2HPO_4$, $NH_4H_2PO_4$), aqua ammonia ($NH_4OH$), ammoniated peat (organic acid ammonium salt), ammoniated calcium superphosphate ($NH_4H_2PO_4$+($NH_4)_2SO_4$ and the like), ammonium sulfate nitrate (($NH_4)_2SO_4$+$NH_4NO_3$), Ammophos (($NH_4)_2SO_4$+($NH_4)_2HPO_4$), ammonium sulfate phosphate (($NH_4)_2SO_4$+($NH_4)_2HPO_4$), human manure (ammonium salt) and stable manure (ammonium salt); nitrate nitrogen such as ammonium nitrate ($NH_4NO_3$), Chile saltpeter ($NaNO_3$), nitrate of lime ($Ca(NO_3)_2$), potassium nitrate ($KNO_3$), ammonium sulfate nitrate (($NH_4)_2SO_4$+$NH_4NO_3$), nitrochalk ($NH_4NO_3$+$CaCO_3$) and Calurea ($Ca(NO_3)_2.4CO(NH_2)_2$); cyanamide nitrogen such as lime nitrogen (CaCN2); urea nitrogen such as urea (CO($NH_2)_2$), and Calurea ($Ca(NO_3)_2.4CO(NH_2)_2$); amino nitrogen such as urea-formaldehyde (Uraform) (CO($NH_2)_2$—HCHO condensate), oxamide ($NH_2$—CO—CO—$NH_2$), guanylurea salt ([$NH_2$—C(NH)—NH—CO—$NH_2$].X, where X is HCl, $H_2SO_4$, $HNO_3$, $H_3PO_3$ and the like), guanidine salt ([$NH_2$—C(NH)—$NH_2$].X, where X is HCl, $H_2SO_4$, $HNO_3$, $H_3PO_3$ and the like) and ammoniated peat (containing CO($NH_2)_2$); and protein nitrogen such as fish manure (containing $NH_2$, NH) and soybean cake (containing $NH_2$, NH).

Preferable phosphorus element may contain calcium superphosphate ($Ca(H_2PO_4)_2$+$CaSO_4$), concentrated superphosphate ($Ca(H_2PO_4)_2$), surpentine-superphosphate (calcium superphosphate+surpentine), fused magnesium phosphate (CaO—MgO—$P_2O_5SiO_2$ glass), calcined phosphate ($Ca_3$ $(PO_4)_2$—$CaNaPO_4$ sclid solution), phosphate mixture (calcium superphosphate (concentrated superphosphate)+fused magnesium phosphate), ground phosphate rock ($Ca_3(PO_4)_2$), precipitated phosphate ($CaHPO_4$), ammonium sulfate phosphate (($NH_4)_2SO_4$+$NH_4H_2PO_4$), potassium sulfate ammonium phosphate (($NH_4)_2SO_4$+$NH_4H_2PO_4$+$K_2SO_4$), ball fertilizer (ammonium sulfate+calcium superphosphate+potassium salt+peat, where the form of phosphate is $Ca(H_2PO_4)_2$), and compound fertilizer ($Ca(H_2PO_4)_2$, $CaHPO_4$, $Ca_3(HPO_4)_2$ and the like).

The fertilizer according to the present invention contains a chelate compound which consists of an oxycarboxylic acid and a metal in such a complex that a living body can easily absorb the metal, and therefore this fertilizer is very effective to cultivate agricultural products, such as vegetables, with their good color, excellent aroma and delicious taste, and antiseptic and fungus resistant properties. It also has been found that, when a living body ingests the agricultural product cultivated with the fertilizer according to the present invention, the chelate can generate in the living body active enzymes which produce a detoxifying effect on hydrogen peroxide, organic peroxides, carcinogenic substances and a resistance to oxidation.

EXAMPLE 1

Citric acid, pentaric acid and acetic acid of respective same amount: 1 part were dissolved in water of 3 parts by weight to prepare an acid solution, and separately selenium trioxide of 0.07 parts was dissolved in water of 3 parts by weight to generate a water solution which was then added to the acid solution and agitated for 60 minutes for complete dissolution. In this case, there would be substantially no problem, if the mixture was agitated for approximately 30 minutes or longer. However, it would be desirable to stir the mixture for 60 minutes or longer to thoroughly temper and homogenize the chelate compound. Subsequently, plant and wood ashes ($K_2CO_3$, $KHCO_3$) of 4 parts as a potassic element were added to the mixture which was agitated for 60 minutes. Also, ammonium sulfate (($NH_4)_2SO_4$) of 0.5 parts as a nitrogenous element and calcium superphosphate (Ca($H_2PO_4)_2+CaSO_4$) of 1 part as a phosphorus element were added to the mixture to obtain the fertilizer containing a chelate and the pH value adjusted to 6.6.

EXAMPLE 2

Acid solution was prepared by dissolving glyceric acid of 2 parts in water of 3 parts, and separately germanium acetate of 0.1 part was dissolved in water of 3 parts by weight to obtain water solution which was then added to the acid solution and agitated for 60 minutes or longer for complete dissolution. Similarly to Example 1, the agitation for 30 minutes or longer would raise substantially no problem, however, it desirably requires agitation for 60 minutes or longer to completely temper and homogenize the chelate compound. Subsequently, kelp ashes ($KCl+K_2SO_4$) of 6 parts as a potassic element were added to the. mixture which was agitated for 60 minutes. After that, aqua ammonia ($NH_4OH$) of 0.2 parts as a nitrogenous element and ground phosphate rock ($Ca_3(PO_4)_2$) of 0.06 parts as a phosphorous element were added to the mixture to obtain the fertilizer which contains the chelate compound with pH value adjusted to 7.1.

Cultivation

The resultant fertilizer was diluted with water to one tenth concentration, and 100 cc of the diluted fertilizer was spread around the stocks of radishes sprouts (daikon sprouts) every week for two months. Two kinds of radish sprouts were cultivated with and without the fertilizer, and the produced radish sprouts were given for three weeks to F344 female rats of 7-weeks old whose liver, kidney and lung were extracted. Then, comparisons were made on color, aroma and taste of the products, amount of the enzymes contained in the internal organs of the rats, antiseptic and fungus resistant properties, detoxifying effect on carcinogenic substances and the like, and a resistance to oxidation regarding the enzymes in the following methods 1 to 3:

1 Examining color, aroma and taste of the radish sprouts in the normal state and in the frizzled condition in high temperature oil.
2 Examining the antiseptic and fungus resistant properties of the radish sprouts chopped into small pieces, placed in water in a container, and left at room temperature.
3 Measuring the amount of glutathione S-transferase (GST) molecular species Yk, Ya, Yb1, Yb2, Yp and Yc as enzymes. Each amount of the GST molecular species was determined as follows:

(i) Preparation of Sample for Electrophoresis (a) Liver and kidney 0.25 M sucrose-10 mM phosphate buffer solution of pH 7.4 was added to the extracted internal organ of the rats in the amount three times the weight of each pieces for homogenization. 20% SDS of 50 microliters and PBS of 275 microliters were added to the homogenized pieces of 20 microliters, and the mixture was diluted with water into one tenth concentration to determine the total amount of protein by the Lowry method. With the diluent, the protein concentration of:the mixture was adjusted to 1 mg/ml, and after boiling the mixture for 2 minutes with heated water, 0.1% BPB of 50 microliters was added to the mixture.

(b) Lung 0.25 M sucrose-10 mM phosphate buffer solution of pH 7.4 was added to the extracted lung in the amount double the weight of the single lung and disintegrated with ultrasonic wave. The ultrasonically disintegrated pieces of 700 g were centrifuged for 10 minutes, and then the total amount of protein in the supernatent liquid was determined by the Lowry method similarly to the above process (a), and the protein concentration was adjusted to 5 mg/ml.

(ii) Electrophoresis

Electrophoresis was performed to separate the protein with 12.5% SDS-polyacrylamide gel (electrophoresis SDS-PAGE) until the protein migrated and passed stack gel at 28 mA, and migrated through separate gel at 36 mA for an hour.

(iii) Imprinting (Western Blot)

Electric current was supplied to nitrocellulose membranes from a TRANS-BLOT CELL manufactured by BIO RAD under 80 Volts for 2 hours to imprint on the membranes the protein separated by the electrophoresis.

(iv) Immunostaining (a) Blocking treatment

Nitrocellulose membranes were subjected to blocking treatment for an hour in a 3% skimmed milk TBS buffer solution of pH 7.4.

(b) Primary antibody

TBS buffer solution containing 3% bovine albumin (BSA) was added to rabbit polyclonal antibody manufactured by Biotrin International Limited which corresponds to any of the rGST A1 (Ya), rGST A3 (Ye), rGST A4 (Yk), rGST M1 (Yb1), rGST M2 (Yb2), and rGST P1 (Yp) for dilution into one thousands concentration. After left overnight in cold room or for an hour at room temperature, the dilution was cleaned for 5 minutes with the TBS buffer solution, two times for 5 minutes with the TBS buffer solution containing 0.05% Tween 20, and further for 5 minutes with the TBS buffer solution.

(c) Secondary antibody

The anti-rabbit IgG goat antibody with a label of alkaline phosphatase manufactured by Jacson Immuno Research Laboratories, Inc. was diluted 1/5000 with the TBS buffer solution of pH 7.4, and after necessary reactions in the solution for 1 hour at room temperature, the dilution was cleaned similarly to the primary antibody.

(d) Color development

Coloring reaction was made with a coloring reagent named "Nitro Blue Tetra" manufactured by Pierce Corporation.

(v) Analysis

The developed color band of each sample was read into the Adobe Photo Shop of the photo retouching software to measure the intensity of the developed color band with NIH image analyzer. The resultant data were compared to examine the derivation of the GST molecular species based on the significant difference assay (the t minus assay). The measurements for the GST molecular species were calculated in the form of intensity ratios (without dimension) assuming the intensities of the developed color band being 1 regarding the liver, kidney and lung of F344 female rats of 7 weeks old to which commercially available regular solid feedstuff was given for 3 weeks instead of the radish sprouts.

Results of Test

Table 1 shows the test results wherein the enzymes are the GST molecular species, and the marks (*) indicate significant differences of Samples 1 and 2 according to the present invention, as compared to Sample 3 without the fertilizer according to the present invention. Samples 1 and 2 obviously indicate advantageous results on good color, excellent aroma and delicious taste of the products as well as the longer antiseptic and fungus resistant properties, compared to Example 3. Example 1 indicates larger amounts of the enzymes Yb1, Yb2 and Yp generated in the liver and Yb2 generated in the kidney. These enzymes Yb1, Yb2, Yp and Yb2 in the liver and kidney have a detoxifying effect on carcinogenic substances and the like, and a resistance to oxidation as compared to Sample 3. Usually, the enzyme Yp cannot be found in the liver, however, it is particularly noticed that the enzyme Yp was heavily derived in the liver. Sample 2 reveals the significant differences in the amounts of the enzymes Ya and Yc in the liver. As a result, it has been found that the fertilizer according to the present invention can cultivate the agricultural products which can remain in the fresh state for a long term because the products have antiseptic and fungus resistant properties, and therefore quality of the products is not deteriorated during transportation to a remote place. When people eat and ingest the products, the chelate can generate enzymes having a detoxifying effect on carcinogenic substances and the like, anticancer effect, and a resistance to oxidation in the living body to improve human health.

TABLE 1

| Characteristics | | | Sample 1 | Sample 2 | Sample 3 |
|---|---|---|---|---|---|
| Effect | Color | | Fresh and deep | Fresh and | Normal |
| | Aroma | | Strong | deep Strong | Normal |
| | Taste | | Rich | Rich | Normal |
| Anti-septic and fungus resistant properties | | | Fungi occur in 8 days. | Fungi occur in 7 days. | Fungi occur in 2 days. |
| Type and amount of enzyme | Liver | Yk | 1.19 ± 0.02 | 0.96 ± 0.05 | 1.03 ± 0.15 |
| | | Ya | 1.28 ± 0.27 | 1.45 ± 0.27(*) | 1.09 ± 0.06 |
| | | Yb1 | 3.31 ± 0.60(*) | 0.87 ± 0.31 | 0.64 ± 0.37 |
| | | Yb2 | 1.53 ± 0.08(*) | 1.34 ± 0.42 | 1.15 ± 0.20 |
| | | Yp | Large amount(*) | None | None |
| | | Yc | 1.31 ± 0.29 | 1.51 ± 0.27(*) | 1.08 ± 0.09 |
| | Kidney | Yk | 1.23 ± 0.08 | 1.28 ± 0.22 | 1.14 ± 0.07 |
| | | Ya | 1.10 ± 0.17 | 1.09 ± 0.13 | 0.86 ± 0.05 |
| | | Yb1 | None | None | None |
| | | Yb2 | 2.71 ± 0.85(*) | 1.16 ± 0.19 | 0.92 ± 0.43 |
| | | Yp | 2.14 ± 0.13 | 1.25 ± 0.16 | 2.11 ± 0.28 |
| | | Yc | 1.39 ± 0.14 | 1.34 ± 0.34 | 1.06 ± 0.04 |

TABLE 1-continued

| Characteristics | | Sample 1 | Sample 2 | Sample 3 |
|---|---|---|---|---|
| Lung | Yk | 1.31 ± 0.22 | 1.32 ± 0.31 | 1.23 ± 0.23 |
| | Ya | None | None | None |
| | Yb1 | None | None | None |
| | Yb2 | 2.16 ± 1.61 | 1.08 ± 0.35 | 0.78 ± 0.24 |
| | Yp | 1.76 ± 0.52 | 1.18 ± 0.30 | 1.26 ± 0.23 |
| | Yc | 1.05 ± 0.58 | 1.54 ± 0.68 | 0.76 ± 0.47 |

What is claimed is:

1. A fertilizer with a chelate element, the fertilizer comprising on the basis of weight 0.01 to 4 parts of a compound of metal for forming the central metal of the chelate, 1 to 5 parts of an oxycarboxylic acid having a carboxyl group, 2 to 8 parts of a potassic element, 0.1 to 1 part of a nitrogenous element, and 0.01 to 2 parts of a phosphorus element to provide a pH value of 6.0 to 7.5 when mixed with water, whereby the fertilizer can derive glutathione S-transferase molecular species when a living body ingests an agricultural product cultivated with the fertilizer.

2. A fertilizer with a chelate element according to claim 1, comprising 0.05 to 2 parts of germanium, acetate as the central metal of the chelate, 1.5 to 2.5 parts of glyceric acid as the oxycarboxylic acid, 5 to 7 parts of a potassic element, 0.1 to 0.5 part of a nitrogenous element, and 0.03 to 1 part of a phosphorus element by weight to provide a pH value of 6.8 to 7.3 when mixed with water.

3. A fertilizer with a chelate element according to claim 1, wherein the compound of metal is one or more selected from the group consisting of metal chlorides, metallic salts, metal oxides and metal hydroxides.

4. A fertilizer with a chelate element according to claim 1, wherein the central metal of the chelate compound is one or more selected from the group consisting of calcium, magnesium, manganese, zinc, copper, molybdenum, iron, aluminum, nickel, cobalt, titanium, gallium, selenium, germanium, vanadium, chromium, silver, strontium, indium, tin, gold and zirconium.

5. A fertilizer with a chelate element according to claim 1, wherein the oxycarboxylic acid is one or more selected from the group consisting of a fatty oxyacid and an aromatic oxyacid.

6. A fertilizer with a chelate element according to claim 5, wherein the fatty oxyacid is a fatty carboxylic acid or an aromatic carboxylic acid with an alcoholic hydroxyl group in the side chain; the aromatic oxyacid is an aromatic carboxylic acid with an alcoholic hydroxyl group in the ring.

7. A fertilizer with a chelate element, the fertilizer comprising 0.03 to 2 parts of selenium trioxide, 0.5 to 1.5 parts of citric acid, 0.5 to 1.5 parts of pentaric acid, 0.5 to 1.5 parts of acetic acid, 3 to 5 parts of a potassic element, 0.3 to 0.8 part of a nitrogenous element, and 0.5 to 1 part of a phosphorus element by weight to provide a pH value of 6.3 to 7.0 when mixed with water, whereby the fertilizer can derive glutathione S-transferase molecular species when a living body ingests an agricultural product cultivated with the fertilizer.

8. A fertilizer with a chelate element according to claim 1 or 7, wherein the glutathione S-transferase molecular species can catalyze the detoxicating reaction of the electrophillic compound by the S-bonded reaction of the electrophillic compound and nucleophillic reduction-type glutathione peroxidase.

9. A method for preparing a fertilizer with a chelate element comprising the steps of mixing, on the basis of weight, 0.01 to 4 parts of a compound of metal for forming the central metal of the chelate, and 1 to 5 parts of an oxycarboxylic acid having a carboxyl group to form an aqueous mixture; and adding to the mixture 2 to 8 parts of a potassic element, 0.1 to 1 part of a nitrogenous element, and 0.01 to 2 parts of a phosphorus element to provide a water solution with a pH value of 6.0 to 7.5.

10. A method for preparing a fertilizer with a chelate element comprising the steps of mixing, on the basis of weight, 0.03 to 2 parts of selenium trioxide for forming the central metal of the chelate, 0.5 to 1.5 parts of citric acid, 0.5 to 1.5 parts of pentaric acid, and 0.5 to 1.5 parts of acetic acid to form an aqueous mixture; and adding to the mixture 3 to 5 parts of a potassic element, 0.3 to 0.8 part of a nitrogenous element, and 0.5 to 1 part of a phosphorus element to provide a water solution with a pH value of 6.3 to 7.0.

* * * * *